Dec. 22, 1931.    H. E. IVES    1,837,365
LIGHT SENSITIVE DEVICE
Original Filed Aug. 20, 1925
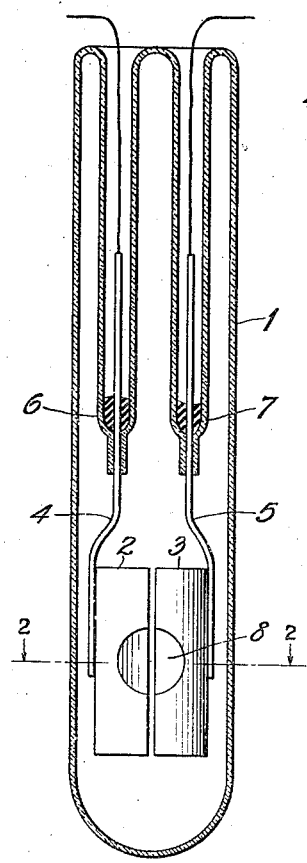
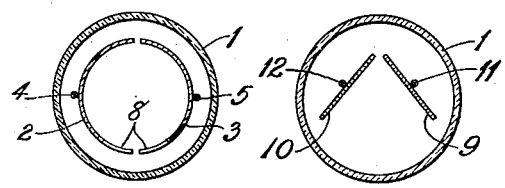
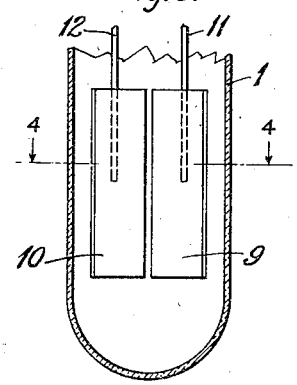
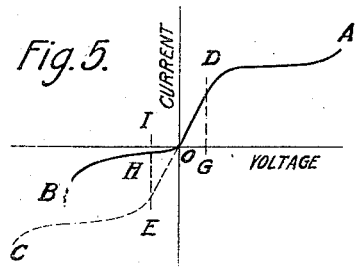
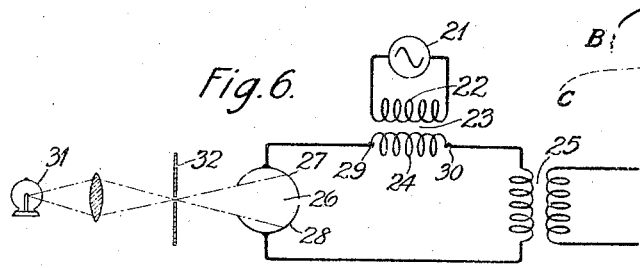
Inventor:
Herbert E. Ives
by *Jack A. R. Palmer*
Attorney Patented Dec. 22, 1931

1,837,365

UNITED STATES PATENT OFFICE

HERBERT E. IVES, OF MONTCLAIR, NEW JERSEY, ASSIGNOR TO BELL TELEPHONE LABORATORIES, INCORPORATED, OF NEW YORK, N. Y., A CORPORATION OF NEW YORK

LIGHT SENSITIVE DEVICE

Original application filed August 20, 1925, Serial No. 51,310. Divided and this application filed February 19, 1927. Serial No. 169,609.

This invention relates to light sensitive devices and more particularly to such devices for modulating electrical oscillations in accordance with light waves.

This invention is a division of copending application Serial No. 51,310, filed August 20, 1925.

An object of the invention is to improve the form of light sensitive cells which are to be energized by alternating current.

A feature of the invention is the electrode structure, which comprises two symmetrical light sensitive electrode surfaces adapted to have the controlling light rays impinge thereon.

In a particular arrangement which is illustrative of the invention, an enclosing vessel contains two symmetrical semi-cylindrical metallic elements which are supported in opposed relation by leading-in wires, with the edges of one element adjacent the edges of the opposing element. The elements are coated with a light sensitive material and enclosed in an inert gas. A suitable opening in the elements allows equal dispersion of the impinging light rays to the surfaces of the elements. When an alternating source of electromotive force is connected to the leading-in wires, either electrode acts as an anode when positively charged, while the opposite element acts as the cathode. The photoelectric current resulting when the cell is illuminated is alternating in form and the half waves of opposite polarity are symmetrical both as to form and amplitude.

A more detailed description of the invention follows and is illustrated in the accompanying drawings:

Fig. 1 shows a photoelectric cell with symmetrical light sensitive elements;

Fig. 2 is a view in cross-section of the cell shown in Fig. 1 and is taken along the line 2—2;

Fig. 3 is a partial view of a cell with a modified form of symmetrical elements;

Fig. 4 is a view in cross-section of the cell of Fig. 3 taken along the line 4—4;

Fig. 5 is a diagram showing the manner in which the photoelectric current varies with the values of the impressed voltages, both in a cell constructed according to the prior art and a cell made in accordance with this invention; and Fig. 6 is a circuit diagram showing one manner of utilizing the cells shown in Figs. 1 and 3 to directly modulate an oscillating current.

Referring to Fig. 1 there is shown a photoelectric cell embodying the present invention. The cell consists of an evacuated glass vessel 1 in which the metallic elements or electrodes 2 and 3 are supported. These elements are supported by rods 4 and 5 which also serve as leading-in wires through the sealing-in portions 6 and 7. The elements 2 and 3 are plates of semi-cylindrical shape and are supported in opposed relation to form a split cylinder with the edges of one element adjacent the edges of the other element. Each plate has a portion cut away from one of its edges, the cut-out portions being symmetrical with respect to each other and forming a circular opening 8 through which incident light rays may be dispersed over both of the plate elements 2 and 3.

The plate elements may be coated with a light sensitive substance. The manner of coating and the material of which the coating consists does not form a part of the present invention, and accordingly any substance may be employed which under the influence of light causes electrons to be emitted. However, it has been found that a hydride of an alkali metal produces highly efficient results. A preferred method of coating the elements consists in vaporizing a supply of an alkali metal in the vessel until the interior of the cell as well as the electrodes themselves are coated. Subsequently the cell surface is heated sufficiently to drive the deposit of metal therefrom, but not enough to displace the coating on the electrodes. Hydrogen may then be introduced in the cell and the electrodes subjected to a glow discharge which results in the formation of a film of the hydride of the metal on the elements. After the evacuation process has been completed an inert gas, such as argon or helium, may be introduced in the cell for purposes well known in the art.

Fig. 3 shows a cell similar to the cell shown in Fig. 1 but the elements in this case consist of flat plates 9 and 10 supported by leading-in wires 11 and 12 respectively. The plates 9 and 10 are positioned in the cell at substantially right angles to each other with the plates in planes converging toward a line parallel to the axis of the vessel. This arrangement is shown more clearly in Fig. 4 which represents a cross-section of the cell shown in Fig. 3 taken along the line 4—4. The angle of the plates 9 and 10 may be varied to provide a maximum photo-electric effect as determined by the characteristics of the cell. In this modification the light rays may be projected upon the plates in any manner to provide an equal dispersion of the light rays over the plate surfaces.

Heretofore, where the output circuit of a photoelectric cell has been employed for modulating an alternating signaling current, it has been the practice to employ separate batteries to provide the necessary electromotive force to draw the electrons from the light sensitive cathode to the anode. This necessitated a source of potential which must at all times be constant, since a slight variation of anode potential produces a disproportionately greater change in the photoelectric current. In accordance with this invention such sources are eliminated and the varying impedances of the cell itself under the influence of light rays cause the alternating current to be modulated directly. The potential of the alternating current itself serves as the anode potential for the cell as will appear hereinafter.

In Fig. 5 the curve BOA represents the manner in which the photoelectric current varies with the impressed voltage in a cell constructed according to the prior art. When, for example, a positive voltage of value OG is applied to the anode of such a cell, the resultant current for a given light intensity is GD. When an equal and opposite voltage OI is impressed, the resultant current is IH. This necessarily follows from the asymmetrical arrangement of the electrodes, and from the fact that in the process of coating the cathode surface, the anode, which is usually much smaller in size, is unintentionally coated with a certain amount of the light sensitive substance. In a cell constructed according to Fig. 1 or Fig. 3, the current produced by a negative voltage is of the same value but of opposite sign to that produced by an equal positive impressed voltage, since each plate, being of the same size and symmetrically disposed with respect to one another, is intentionally coated with an equal amount of light sensitive material. The curve COA shows this relation and it may be seen that both halves of the curve are truly symmetrical.

Accordingly, should an alternating voltage be impressed upon a cell with a characteristic represented by the curve BOA, there will be produced an alternating photoelectric current with half waves asymmetrical both as to form and amplitude. On the other hand, when an alternating voltage is impressed upon a cell constructed according to Fig. 1 or Fig. 3, the resultant photoelectric current is symmetrical both as to form and amplitude. It will be noted that the portion EOD of the curve COA is substantially a straight line. Therefore, if an alternating voltage of maximum value OG is impressed upon the terminals of the cell of Fig. 1 the resultant photoelectric current will be an alternating current of the same wave shape as that of the impressed voltage.

Under certain conditions it may be desirable to use a signaling current of distorted wave form but having symmetrical half waves. In such a case the maximum value of the impressed voltage should be greater than the value OG.

Referring to Fig. 6 there is shown one method of employing a cell according to Fig. 1 or Fig. 3 as a modulator. The source of carrier current 21 is connected to the primary winding 22 of the transformer 23 and the secondary winding 24 of this transformer is connected in series with the primary winding of line transformer 25 and in series with the elements of cell 26. Thus elements 27 and 28 act each alternately as a cathode and an anode in accordance with the change in sign of the impressed carrier current.

When the light from source 31 is completely screened from cell 26 the impedance of the cell is of the order of infinity. Assuming light rays of constant intensity to be focused upon the elements 27 and 28 and assuming that the instantaneous potential of the terminal 29 of the primary winding of transformer 23 is positive with respect to that of terminal 30, then element 27 acts as an anode and attracts the electrons emitted from the element or cathode 28 as a result of the light waves impinging thereon.

In accordance with well established laws the value of the current flowing from the element 27 to the element 28 is, therefore, in proportion to the instantaneous difference of potential between the terminals 29 and 30. When, however, the current passes through the opposite half wave to that above considered, the terminal 30 is at a higher potential than terminal 29 and accordingly element 28 acts as an anode with respect to element 27. Thus a current of the magnitude determined by the intensity of the light rays and in a form determined by the wave shape from the source 21 flows through the primary winding of transformer 25 and induces in the secondary winding of this transformer a similar current wave which may be utilized for any species of signaling.

It will be seen from the foregoing that if the source 21 generates an alternating current of characteristic wave form, such as is commonly used for carrier signaling, then under the influence of light rays of varying intensity from the source 31 the amplitude of the photoelectric current flows through the cell 26 and the transformer 25 is correspondingly affected.

The varying intensity of the light from source 31 may be controlled by appropriate signals or even by the elemental characteristics of a picture film 32, thus causing the carrier current from source 21 to be directly modulated in accordance with said signals or picture characteristics.

It is understood that the invention is not limited to the specific details of construction and the mode of preparation hereinbefore described. For example, the coating upon the electrodes may be simply an alkali metal or other light sensitive material. Furthermore, the hydrogen glow discharge and the introduction of an inert gas may be omitted.

What is claimed is:

1. A photoelectric cell comprising a pair of semi-cylindrical electrodes, said electrodes being mounted in opposed relation to form a split cylinder, and each electrode having an opening cut in one edge, said openings being symmetrical with respect to each other.

2. A photoelectric cell comprising two electrodes only, which are substantially identical in construction and have light sensitive opposed surfaces, said electrodes having their peripheries more widely spaced in one portion than in another to form a light opening between said electrodes and to permit light passing therethrough to reach a considerable portion at least of said opposed surfaces simultaneously, whereby equal amounts of emitted electrons may pass from each electrode to the other.

3. A photoelectric cell comprising two electrodes only, which are in the form of similar curved plates having light sensitive opposed surfaces, said electrodes having their peripheries more widely spaced in one portion than in another to form a light opening between said electrodes and to permit light passing therethrough to reach a considerable portion at least of said opposed surfaces simultaneously, whereby equal amounts of emitted electrons may pass from each electrode to the other.

4. A photoelectric cell comprising two electrodes only, having oppositely disposed light sensitive surfaces of equal area and equally sensitive to light, and supporting means for said electrodes to space them apart to form an opening for light, portions of said surfaces opposite said opening being in a diverging relation with respect to each other, whereby equal amounts of emitted electrons may pass from each electrode to the other.

5. A photoelectric cell comprising two electrodes only, having oppositely disposed surfaces opposite portions of which are in a diverging relation with respect to each other, said electrodes comprising the same light sensitive electron emitting substance and being equally responsive to the same amount of light whereby equal amounts of emitted electrons may pass from each electrode to the other when the electrodes are equally illuminated.

In witness whereof, I hereunto subscribe my name this 17th day of February, A. D. 1927.

HERBERT E. IVES.